(12) United States Patent
Tamura et al.

(10) Patent No.: US 9,531,259 B2
(45) Date of Patent: Dec. 27, 2016

(54) POWER SUPPLY CIRCUIT

(71) Applicant: DENSO CORPORATION, Kariya, Aichi-pref. (JP)

(72) Inventors: Mitsuhiro Tamura, Chiryu (JP); Yoshimitsu Honda, Toyohashi (JP)

(73) Assignee: DENSO CORPORATION, Kariya (JP)

( * ) Notice: Subject to any disclaimer, the term of this patent is extended or adjusted under 35 U.S.C. 154(b) by 141 days.

(21) Appl. No.: 14/644,235

(22) Filed: Mar. 11, 2015

(65) Prior Publication Data

US 2015/0270774 A1    Sep. 24, 2015

(30) Foreign Application Priority Data

Mar. 19, 2014    (JP) .................................. 2014-56611

(51) Int. Cl.
*H02M 3/07*    (2006.01)
*B60L 11/18*    (2006.01)
*H02M 1/00*    (2006.01)

(52) U.S. Cl.
CPC ............... *H02M 3/07* (2013.01); *B60L 11/18* (2013.01); *H02M 2001/0003* (2013.01)

(58) Field of Classification Search
CPC ..................................................... H02M 3/07
See application file for complete search history.

(56) References Cited

U.S. PATENT DOCUMENTS

| 5,072,134 | A | * | 12/1991 | Min | ........................ | G05F 1/465 |
|---|---|---|---|---|---|---|
| | | | | | | 327/536 |
| 5,841,725 | A | | 11/1998 | Kang et al. | | |
| 2002/0024380 | A1 | * | 2/2002 | Kono | ........................ | G05F 5/00 |
| | | | | | | 327/541 |
| 2002/0034082 | A1 | | 3/2002 | Yokomizo et al. | | |
| 2004/0017247 | A1 | | 1/2004 | Yasui et al. | | |
| 2005/0258891 | A1 | | 11/2005 | Ito et al. | | |
| 2015/0109706 | A1 | * | 4/2015 | Iwamizu | ................ | H02H 9/025 |
| | | | | | | 361/84 |

FOREIGN PATENT DOCUMENTS

| JP | H10-190453 A | 7/1998 |
|---|---|---|
| JP | 2010-045943 A | 2/2010 |

* cited by examiner

*Primary Examiner* — Rexford Barnie
*Assistant Examiner* — Daniel Kessie
(74) *Attorney, Agent, or Firm* — Posz Law Group, PLC

(57) ABSTRACT

In a power supply circuit having input and output terminals, an error amplifier has first and second paths independent of each other to output a control voltage, a first MOS transistor is interposed between the input terminal and an intermediate node, and a step-up section steps up a voltage supplied from the intermediate node and outputs the stepped-up voltage to the output terminal. The step-up section includes a capacitor, a second MOS transistor, a third MOS transistor, and a drive circuit. The first end of the capacitor is connected to the intermediate node. The second MOS transistor is interposed between the input terminal and a second end of the capacitor. The third MOS transistor is interposed between the second end of the capacitor and a ground. The drive circuit drives the second and third MOS transistors in a complementary manner based on a clock signal.

8 Claims, 8 Drawing Sheets

POWER SUPPLY CIRCUIT

CROSS REFERENCE TO RELATED APPLICATION

This disclosure is based on and claims priority to Japanese Patent Application No. 2014-56611 filed on Mar. 19, 2014, the content of which is incorporated herein by reference.

FIELD

The present disclosure relates to a power supply circuit for generating an output voltage having a predetermined target value from an input voltage.

BACKGROUND

A power supply circuit using a typical charge pump circuit as typified by a Dickson charge pump has advantages over a switching regulator requiring a coil in that it can have a small circuit size and archive low noise. Although a typical charge pump circuit has a function to step up an input voltage, it does not have a function to step down the input voltage. For this reason, it may not suitable for use (e.g., for a vehicle) where a constant voltage needs to be generated from an input voltage which fluctuates over a wide range. Some techniques were proposed to overcome this disadvantage by modifying a typical charge pump circuit.

In JP H10-337003A corresponding to U.S. Pat. No. 5,841,725, when an output voltage is higher than a target voltage, a charge pump is stopped so that the output voltage can decrease, and when the output voltage is smaller than the target voltage, the charge pump is started so that the output voltage can increase. In JP 2006-014581A corresponding to US 2005/025889A, when an output voltage is higher than a target voltage, a dropper power supply (i.e., series regulator) is driven to perform a step-down operation, and when the output voltage is smaller than the target voltage, a charge pump circuit is driven to perform a step-up operation.

In such structures, when switching occurs in a sequence of operations (i.e., switching between ON and OFF of the charge pump, switching between the dropper power supply and the charge pump), its output characteristics may have a step, so that linearity of an output voltage may be degraded accordingly. The degradation in linearity of the output voltage becomes significant if a destination circuit to which the output voltage is inputted has characteristics varying depending on its input voltage, i.e., if the destination circuit requires high accuracy for its input voltage. Therefore, the conventional structures may not be suitable for a power supply circuit.

In JP 2010-045943A, a duty cycle of a clock signal for turning ON and OFF a switch of a charge pump is changed so that a detection value of an output voltage can be equal to a target value. However, even in this structure, it is difficult to ensure a wide range over which the output voltage can change. Therefore, if an input voltage fluctuates over a wide range, it may be impossible to generate a predetermined constant output voltage from the input voltage.

In JP 2003-348822A corresponding to US 2004/0017247A, the amount of an increase in a voltage is reduced by switching a power voltage for a clock buffer of a charge pump in small steps using a D/A converter, so that noise can be reduced. However, in this structure, it is impossible to perform a step-down operation, and by extension, to generate a predetermined constant output voltage. Further, since its circuit size becomes large, its manufacturing cost may become large.

SUMMARY

In view of the above, it is an object of the present disclosure to provide a power supply circuit for generating a predetermined output voltage from an input voltage without an increase in a circuit size even when the input voltage fluctuates over a wide range.

According to an aspect of the present disclosure, a power supply circuit is configured to generate an output voltage having a predetermined target value from an input voltage inputted through a power input terminal and outputs the output voltage through a power output terminal. The power supply circuit includes a voltage detector configured to output a detection voltage depending on a voltage of the power output terminal, a command voltage generator configured to generate a command voltage to command the target value for the output voltage, an error amplification circuit having a first output path and a second output path independent of the first output path to output a control voltage depending on a difference between the detection voltage and the command voltage, a first MOS transistor interposed in a path from the power input terminal to an intermediate node and having a gate to which the control voltage outputted through the first output path is supplied, and a step-up section configured to step up a voltage supplied from the intermediate node and output the stepped-up voltage to the power output terminal. The step-up section includes a capacitor, a second MOS transistor, a third MOS transistor, and a drive circuit.

A first end of the capacitor is connected to the intermediate node through a reverse-flow-prevention switching device. The second MOS transistor is interposed in a path from the power input terminal to a second end of the capacitor and has a gate to which the control voltage outputted through the second output path is supplied. The third MOS transistor is interposed in a path from the second end of the capacitor to a ground. The drive circuit drives the second MOS transistor and the third MOS transistor in a complementary manner based on a clock signal. When the clock signal is at a first level, the drive circuit continues to supply the control voltage to the gate of the second MOS transistor while supplying an OFF-drive voltage to a gate of the third MOS transistor to turn OFF the third MOS transistor. When the clock signal is at a second level different from the first level, the drive circuit supplies an OFF-drive voltage, instead of the control voltage, to the gate of the second MOS transistor to turn OFF the second MOS transistor while supplying an ON-drive voltage to the gate of the third MOS transistor to turn ON the third MOS transistor.

Since the drive circuit drives the second MOS transistor and the third MOS transistor in a complementary manner in this way, a charge pump operation comparable to that performed by a typical charge pump circuit is performed in the step-up section. Specifically, when the second MOS transistor is OFF, and the third MOS transistor is ON, the capacitor is charged by a voltage supplied from the intermediate node. On the other hand, when the second MOS transistor is ON, and the third MOS transistor is OFF, the second end of the capacitor increases to a voltage of a main terminal of the second MOS transistor which is ON, and the output voltage stepped-up is outputted from the first end of the capacitor. This charge pump operation is continuously performed regardless of a value of the output voltage.

However, the voltage of the intermediate node as the input voltage to the step-up section and the voltage of the main terminal of the second MOS transistor for determining a step-up factor (i.e., gain) for the charge pump operation are controlled based on the value of the output voltage in a way described below. According to the aspect, the error amplification circuit controls and drives the first MOS transistor and the second MOS transistor independently so that the output voltage can be equal to the target value. Further, the first MOS transistor is interposed in the path through which the input voltage is supplied to the step-up section, and the second MOS transistor is interposed in the path through which the voltage for determining the step-up factor for the charge pump operation is supplied. In this structure, when the output voltage deviates from the target voltage, so that there occurs a difference between the detection voltage and the command voltage, the error amplification circuit outputs the control voltage depending on the difference. The first MOS transistor and the second MOS transistor are driven by the control voltage. Accordingly, the input voltage to the step-up section and the voltage for determining the step-up factor are changed.

As described above, according to the aspect, the power supply circuit performs the charge pump operation comparable to that performed by a typical charge pump circuit while performing the feedback control of the output voltage like a series regulator (i.e., dropper power supply). Thus, the power supply circuit can perform not only a step-up operation to step up the input voltage, but also a step-down operation to step down the input voltage. Thus, the power supply circuit can generate a predetermined output voltage from an input voltage without an increase in a circuit size even when the input voltage fluctuates over a wide range.

Further, in the power supply circuit, the control of the first MOS transistor and the second MOS transistor is not switched during a series of operations including the step-up operation, the step-down operation, and a switching operation between the step-up operation and the step-down operation. That is, even when the input voltage fluctuates over a wide range, the operations are performed seamlessly over the entire range. Thus, the power supply circuit does not have output characteristics like a step caused by a gap occurring in the output voltage. Therefore, the output voltage can have high linearity.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Embodiments of the present disclosure are described below with reference to the drawings in which like characters of reference indicate the same or equivalent parts.

First Embodiment

A first embodiment of the present disclosure is described below with reference to FIGS. 1-5.

Figure 1:
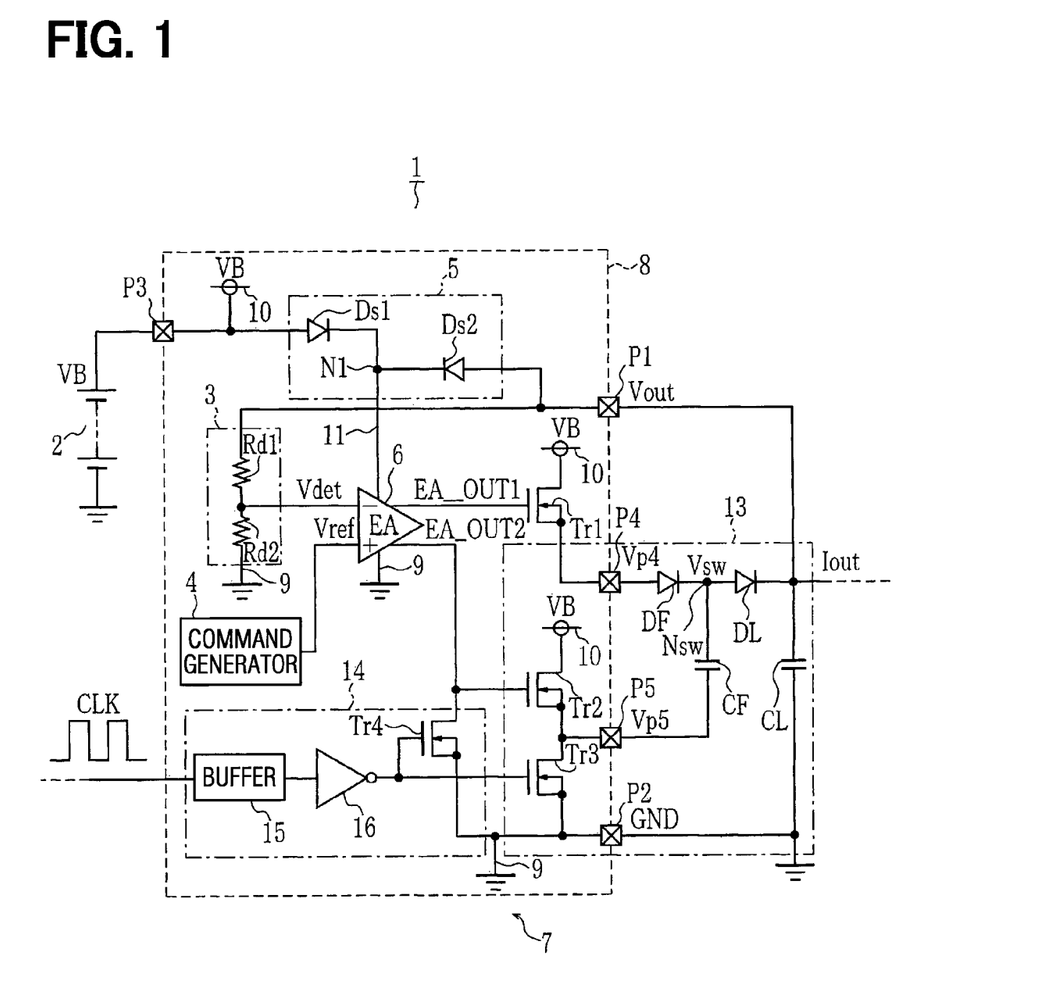
FIG. 1 is a circuit diagram of a power supply circuit according to a first embodiment of the present disclosure.

A power supply circuit 1 shown in FIG. 1 generates an output voltage Vout having a predetermined target value from an input voltage. A battery voltage VB outputted from a battery 2 mounted to a vehicle is inputted to the power supply circuit 1. Since the battery 2 is mounted to the vehicle, the battery voltage VB may fluctuate over a wide range. The output voltage Vout of the power supply circuit 1 is supplied to circuits which construct, for example, an electronic control unit (ECU) mounted to the vehicle.

The power supply circuit 1 includes a voltage detector 3, a command voltage generator 4 (depicted as "command generator" in FIG. 1), a voltage selector 5, an error amplifier (EA) 6, a transistor Tr1, and a step-up section 7. Components of the power supply circuit 1 except a portion of the step-up section 7 are implemented as an integrated circuit (IC) 8 as indicated by a broken line in FIG. 1. The IC 8 has terminals P1 to P5 which extend from inside to outside of a package of the IC 8.

The voltage detector 3 is a series circuit of resistors Rd1 and Rd2 connected between the power output terminal P1 for outputting the output voltage Vout and a ground line 9. The voltage detector 3 outputs from a node between the resistors Rd1 and Rd2 a detection voltage Vdet depending on the output voltage Vout. The ground line 9 is connected to the ground terminal P2. The command voltage generator 4 is, for example, a bandgap reference circuit and generates a command voltage Vref to command a target value Vs for the output voltage Vout.

The voltage selector 5 includes two diodes Ds1 and Ds2. The diode Ds1 is inserted in a forward direction in a power supply path from an input power line 10 to a node N1. The input power line 10 is connected to the power input terminal P3 to which the battery voltage VB is supplied. The diode Ds2 is inserted in a forward direction in a power supply path from the power output terminal P1 to the node N1. The node N1 is connected to a power supply terminal of the error amplifier 6 through a power line 11. According to this configuration, the voltage selector 5 selectively supplies the higher of the voltage (input voltage) of the power input terminal P3 and the voltage (output voltage) of the power output terminal P1 as a power voltage for the error amplifier 6.

Figure 2:
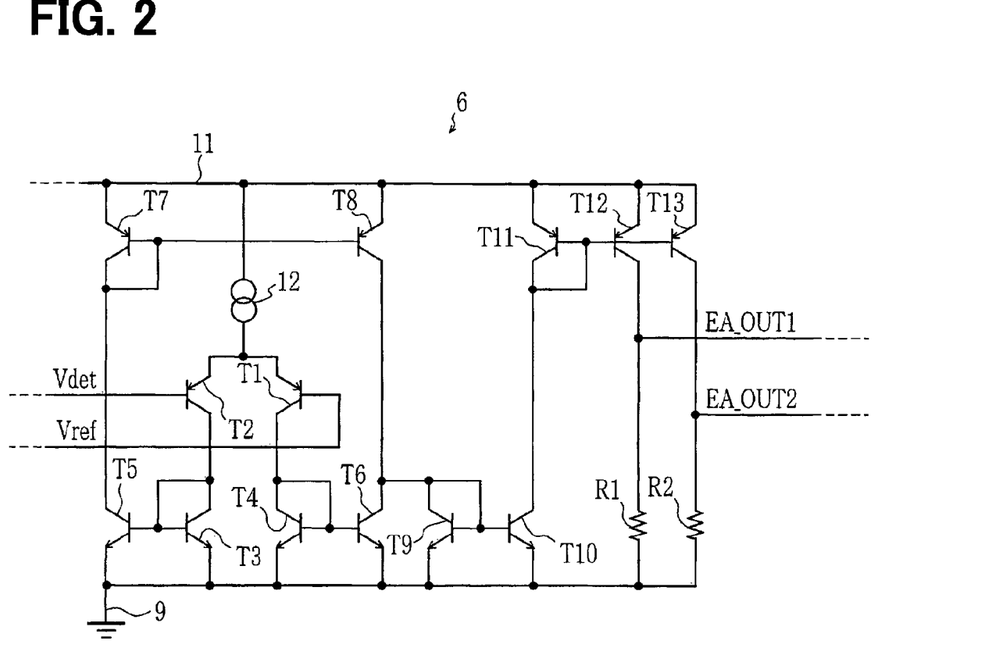
FIG. 2 is a circuit diagram of an error amplifier of the power supply circuit according to the first embodiment.

The detection voltage Vdet is inputted to an inverting input terminal of the error amplifier 6, and the command voltage Vref is inputted to a non-inverting input terminal of the error amplifier 6. The error amplifier 6 has first and second output terminals for respectively outputting control voltages EA_OUT1 and EA_OUT2 depending on a difference between the detection voltage Vdet and the command voltage Vref. Each of the control voltages EA_OUT1 and EA_OUT2 changes in the same manner depending on the difference between the detection voltage Vdet and the command voltage Vref. However, as shown in FIG. 2, inside the error amplifier 6, a first output path through which the control voltage EA_OUT1 is outputted is independent of a second output path through which the control voltage EA_OUT2 is outputted. For this reason, a change in one of the control voltages EA_OUT1 and EA_OUT2 due to, for example, operating conditions of its destination circuit does not affect the other of the control voltages EA_OUT1 and EA_OUT2.

FIG. 2 shows an example of a specific structure of the error amplifier 6. In the example shown in FIG. 2, the error amplifier 6 includes transistors, T1 to T13, a constant current circuit 12, and resistors R1 and R2. The transistors T1 and T2 are PNP transistors and form a differential input pair. The base of the transistor T1 is connected to the non-inverting input terminal so that the command voltage Vref can be applied to the base of the transistor T1. The base of the transistor T2 is connected to the inverting input terminal so that the detection voltage Vdet can be applied to the base of the transistor T2. The emitters of the transistors T1 and T2 are connected together to the power line 11 through the constant current circuit 12.

The collector of the transistor T1 is connected to the ground line 9 through the transistor T3, while the collector of the transistor T2 is connected to the ground line 9 through the transistor T4. The transistors T3 and T4 are NPN transistors for loads. The transistor T3 forms a current mirror circuit with the transistor T5, while the transistor T4 forms a current mirror circuit with the transistor T6. The transistors T5 and T6 are NPN transistors. The emitters of the transistors T5 and T6 are connected to the ground line 9. The collector of the transistor T5 is connected to the power line 11 through the transistor T7, while the collector of the transistor T6 is connected to the power line 11 through the transistor T8. The transistors T7 and T8 are PNP transistors and form a current mirror circuit.

The transistor T9 is an NPN transistor and connected between the collector of the transistor T6 and the ground line 9. The transistor T10 is an NPN transistor and forms a current mirror circuit with the transistor T9. The collector of the transistor T10 is connected to the power line 11 through the transistor T11. The transistor T11 is a PNP transistor and forms a current mirror circuit with the transistors T12 and T13. The transistors T12 and T13 are PNP transistors.

The collector of the transistor T12 is connected to the ground line 9 through the resistor R1, while the collector of the transistor T13 is connected to the ground line 9 through the resistor R2. A node between the transistor T12 and the resistor R1 is connected to the first output terminal for outputting the control voltage EA_OUT1. A node between the transistor T13 and the resistor R2 is connected to the second output terminal for outputting the control voltage EA_OUT2.

Returning to FIG. 1, the first output terminal of the error amplifier 6 is connected to the gate of the transistor Tr1. The transistor Tr1 is an N-channel MOS transistor and corresponds to a first MOS transistor recited in claims. The drain of the transistor Tr1 is connected to the input power line 10, and the source of the transistor Tr1 is connected to the terminal P4. That is, the transistor Tr1 is interposed in a path from the power input terminal P3 to the terminal P4. The terminal P4 corresponds to an intermediate node recited in claims. Thus, the transistor Tr1 is configured as a source-follower to which the control voltage EA_OUT1 is supplied as an input.

The step-up section 7 almost doubles a voltage supplied from the terminal P4 and outputs the doubled voltage to the power output terminal P1. The step-up section 7 includes a charge pump circuit 13 and a drive circuit 14. The charge pump circuit 13 includes diodes DF and DL, capacitors CF and CL, and N-channel MOS transistors Tr2 and Tr3. The transistors Tr2 and Tr3 correspond to second and third MOS transistors recited in claims, respectively.

The diode DF corresponds to a reverse flow prevention switching device recited in claims. The anode of the diode DF is connected to the terminal P4, and the cathode of the diode DF is connected to a node Nsw. The node Nsw is connected to a first terminal of the capacitor CF and the anode of the diode DL. A second terminal of the capacitor CF is connected to the terminal P5. The cathode of the diode DL is connected to the ground terminal P2 through the capacitor CL. A node between the diode DL and the capacitor CL is connected to the power output terminal P1.

The drain of the transistor Tr2 is connected to the input power line 10, and the source of the transistor Tr2 is connected to the terminal P5. The gate of the transistor Tr2 is connected to the second output terminal of the error amplifier 6. That is, the transistor Tr2 is interposed in a path from the power input terminal P3 to the second terminal of the capacitor CF. Thus, the transistor Tr2 is configured as a source-follower to which the control voltage EA_OUT2 is supplied as an input.

The drain of the transistor Tr3 is connected to the terminal P5, and the source of the transistor Tr3 is connected to the ground line 9. That is, the transistor Tr3 is interposed in a path from the second terminal of the capacitor CF to the ground terminal P2. A drive voltage outputted from the drive circuit 14 is supplied to the gates of the transistors Tr2 and Tr3.

The drive circuit 14 includes a buffer 15, an inverter circuit 16, and a transistor Tr4. A clock signal CLK supplied from an external circuit is inputted to the inverter circuit 16 through the buffer 15. According to the first embodiment, the clock signal CLK has a duty cycle of 50%. The inverter circuit 16 outputs a voltage to the gates of the transistors Tr3 and Tr4 by logically inverting the clock signal CLK. The drain of the transistor Tr4 is connected to the gate of the transistor Tr2, and the source of the transistor Tr4 is connected to the ground line 9.

The drive circuit 14 drives the transistors Tr2 and Tr3 in a complementary manner based on the clock signal CLK. That is, when the clock signal CLK is at a high level (i.e., first level recited in claims) of, for example, +5V, an output voltage of the inverter circuit 16 is at a low level (i.e., ground potential) of, for example, 0V. As a result, the transistors Tr3 and Tr4 are turned OFF by a low-level voltage outputted from the inverter circuit 16. A low-level voltage is hereinafter sometimes referred to as the "OFF-drive voltage". Since the transistor Tr4 is turned OFF, the control voltage EA_OUT2 is supplied to the gate of the transistor Tr2. Thus, the transistor Tr2 is turned ON by the control voltage EA_OUT2.

On the other hand, when the clock signal CLK is at a low level (i.e., second level recited in claims) of, for example, 0V, the output voltage of the inverter circuit 16 is at a high level. As a result, the transistors Tr3 and Tr4 are turned ON by a high-level voltage outputted from the inverter circuit 16. A high-level voltage is hereinafter sometimes referred to as the "ON-drive voltage". Since the transistor Tr4 is turned ON, a low-level voltage (i.e., OFF-drive voltage) is supplied to the gate of the transistor Tr2 regardless of a voltage value of the control voltage EA_OUT2 so that the transistor Tr2 can be turned OFF.

Since the transistors Tr2 and Tr3 are driven in a complementary manner in this way, a charge pump operation comparable to that performed by a typical charge pump circuit is performed. That is, when the transistor Tr2 is OFF, and the transistor Tr3 is ON, the capacitor CF is charged to almost the voltage of the terminal P4. On the other hand, when the transistor Tr2 is ON, and the transistor Tr3 is OFF, the second terminal of the capacitor CF is increased to the source voltage (i.e., voltage of the terminal P5) of the transistor Tr2 which is ON. Accordingly, the voltage of the node Nsw connected to the first terminal of the capacitor CF becomes the sum of the charge voltage of the capacitor CF and the source voltage of the transistor Tr2 which is ON. The voltage (i.e., voltage of the node Nsw) stepped up in this way is outputted as the output voltage Vout through the diode D2.

As described above, the step-up section 7 continuously performs the charge pump operation comparable to that performed by a typical charge pump circuit regardless of a voltage value of the output voltage Vout. It is noted that the input voltage (i.e., voltage of the terminal P4) to the charge pump circuit 13 and the voltage for determining the step-up factor (i.e., gain) of the charge pump circuit 13 are feedback-controlled based on the output voltage Vout. Details of the feedback control are described later.

Figure 3:
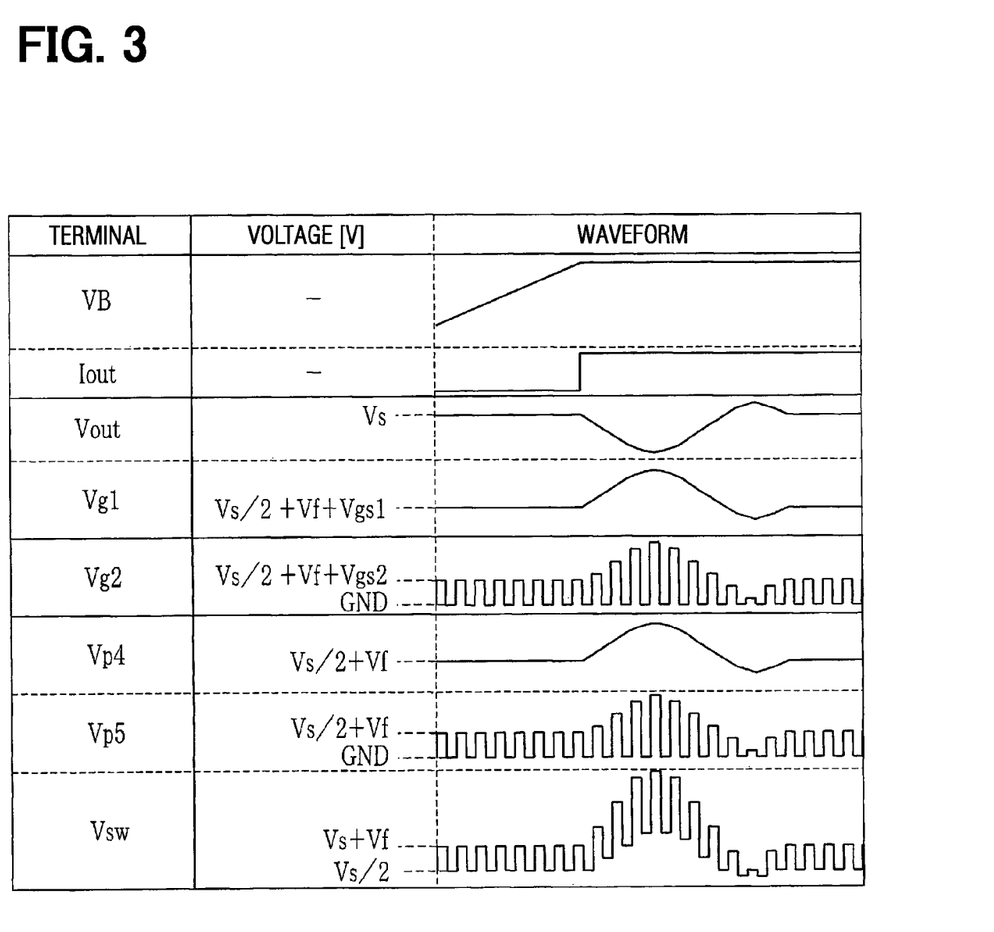
FIG. 3 is a timing diagram of the power supply circuit according to the first embodiment.

Next, an operation of the power supply circuit 1 having the above structure is described with further reference to a timing diagram shown in FIG. 3. FIG. 3 illustrates simplified waveforms of a battery voltage VB, an output current Iout, an output voltage Vout, a gate voltage Vg1 of the transistor Tr1, a gate voltage Vg2 of the transistor Tr2, a voltage Vp4 of the terminal P4, a voltage Vp5 of the terminal P5, and a voltage Vsw of the node Nsw.

In normal times where the output voltage Vout is equal to the target value Vs, voltage values of the portions are given as follows. That is, in this case, the control voltage EA_OUT1, i.e., the gate voltage Vg1 of the transistor Tr1 is given by the following equation (1), where Vf represents a forward voltage of a diode, and Vgs1 represents a gate-to-source voltage of the transistor Tr1.

$$Vg1=(Vs/2)+Vf+Vgs1 \quad (1)$$

When the clock signal is at a high level, the gate voltage Vg2 of the transistor Tr2 is given by the following equation (2), where Vgs2 represents a gate-to-source voltage of the transistor Tr2.

$$Vg2=(Vs/2)+Vf+Vgs2 \quad (2)$$

It is noted that when the clock signal CLK is at a low level, the gate voltage Vg2 is at a ground potential GND (=0).

The voltage Vp4 of the terminal P4 as an input voltage to the charge pump circuit 13 is given by the following equation (3).

$$Vp4=(Vs/2)+Vf \quad (3)$$

When the clock signal CLK is at a low level, the voltage Vp5 of the terminal P5 for determining the step-up factor of the charge pump circuit 13 is given by the following equation (4).

$$Vp5=(Vs/2)+Vf \quad (4)$$

It is noted that when the clock signal CLK is at a high level, the voltage Vp5 is at a ground potential GND (=0).

When the clock signal CLK is at a low level, the voltage Vsw of the node Nsw is given by the following equation (5a).

$$Vsw=Vs+Vf \quad (5a)$$

On the other hand, when the clock signal CLK is at a high level, the voltage Vsw is given by the following equation (5b).

$$Vsw=Vs/2 \quad (5b)$$

As mentioned previously, the step-up section 7 continuously performs the charge pump operation comparable to that performed by a typical charge pump circuit. However, in the power supply circuit 1, a negative feedback circuit is implemented mainly by the error amplifier 6 so that the output voltage Vout can be feedback-controlled. Thus, the transistor Tr1, which is interposed in a path through which the input voltage to the charge pump circuit 13 is supplied, and the transistor Tr2, which is interposed in a path through which the voltage for determining the step-up factor of the charge pump circuit 13 is supplied, are driven and controlled by the output of the error amplifier 6. The output voltage Vout is feedback-controlled as follows.

Firstly, a first case where the output voltage Vout becomes less than the target value Vs is described. When the battery voltage VB as an input voltage decreases or the output current Iout increases due to, for example, operating conditions of its destination circuit for the output voltage Vout under a condition where the output voltage Vout is equal to the target value Vs, the output voltage Vout decreases from the target value Vs. Accordingly, the control voltages EA_OUT1 and EA_OUT2 outputted from the error amplifier 6 start to increase from their steady values.

Like the control voltage EA_OUT1, the gate voltage Vg1 and the source voltage (i.e., voltage Vp4) of the transistor Tr1 start to increase. Further, like the control voltage EA_OUT2, the gate voltage Vg2 and the source voltage (i.e., voltage Vp5) of the transistor Tr2 observed when the clock signal CLK is at a high level start to increase. As a result of these operations, the input voltage and the step-up factor of the charge pump circuit 13 increase, so that the output voltage Vout increases to approach the target value Vs accordingly.

Next, a second case where the output voltage Vout becomes greater than the target value Vs is described. When the output voltage Vout increases above the target value Vs, the control voltages EA_OUT1 and EA_OUT2 outputted from the error amplifier 6 start to decrease from the steady values. Accordingly, like the control voltage EA_OUT1, the gate voltage Vg1 and the source voltage (i.e., voltage Vp4) of the transistor Tr1 start to decrease.

Further, like the control voltage EA_OUT2, the gate voltage Vg2 and the source voltage (i.e., voltage Vp5) of the transistor Tr2 observed when the clock signal CLK is at a high level start to decrease. As a result of these operations, the input voltage and the step-up factor of the charge pump circuit 13 decrease, so that the output voltage Vout decreases to approach the target value Vs accordingly.

As described above, the power supply circuit 1 performs the charge pump operation comparable to that performed by a typical charge pump circuit while performing the feedback control of the output voltage Vout like a series regulator (i.e., dropper power supply). Thus, the power supply circuit 1 can perform not only a step-up operation to step up the battery voltage VB, but also a step-down operation to step down the battery voltage VB. Therefore, compared to, for example, a step-up/down switching regulator, the circuit size is reduced while noise is reduced. Further, even when the battery voltage VB as an input voltage fluctuates over a wide range, the output voltage Vout having the target value Vs can be generated from the battery voltage VB. In particular, in the first embodiment, since the battery voltage VB is supplied from the battery 2 mounted to the vehicle and likely to fluctuate over a wide range, the advantage obtained by the first embodiment is very effective.

Further, in the power supply circuit 1, the control of the transistors Tr1 and Tr2 is not switched during a series of operations including the step-up operation, the step-down operation, and a switching operation between the step-up operation and the step-down operation. That is, even when the battery voltage VB fluctuates over a wide range, the operations are performed seamlessly over the entire range. Thus, the power supply circuit 1 does not have output characteristics like a step caused by a gap occurring in the output voltage Vout. Therefore, the output voltage Vout can have high linearity.

Further, the power supply circuit 1 has the voltage selector 5 for selectively supplying the higher of the battery voltage VB and the output voltage Vout as a power voltage for the error amplifier 6. Thus, even when one of the battery voltage VB and the output voltage Vout is relatively low, the error amplifier 6 can be supplied with the other which is relatively high. Therefore, the error amplifier 6 can output the control voltages EA_OUT1 and EA_OUT2 having voltage values capable of normally turning ON the transistors Tr1 and Tr2, which are N-channel MOS transistors.

Figure 4:
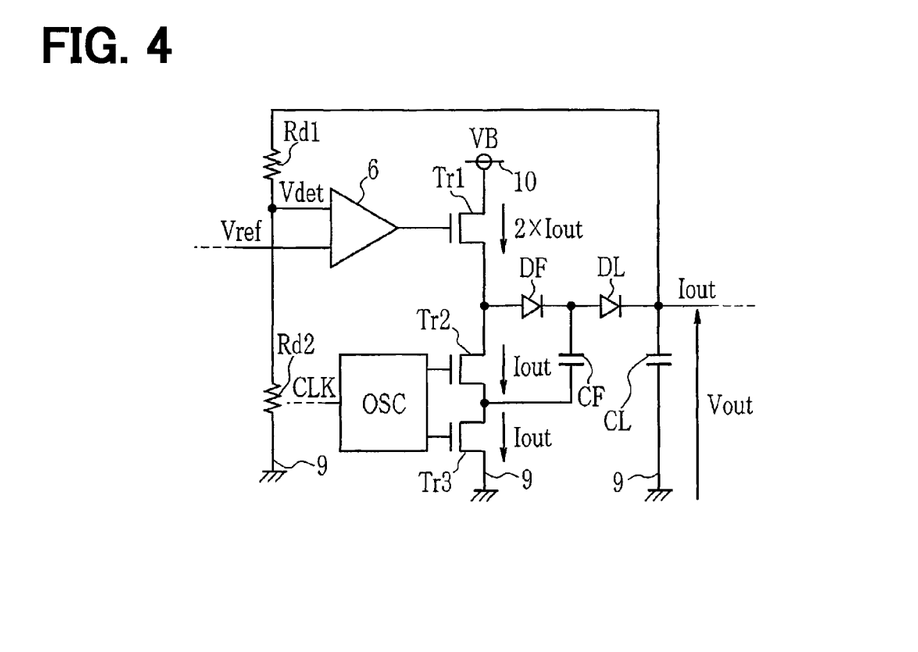
FIG. 4 is a circuit diagram of a power supply circuit according to a comparison example.

Advantages similar to those of the first embodiment described above may be achieved by a comparison example shown in FIG. 4. In the comparison example, the drain of the transistor Tr2 is connected to the source of the transistor Tr1. Further, in this case, the output of the error amplifier 6 is not supplied to the gate of the transistor Tr2. In the comparison example, like in the first embodiment, the transistors Tr2 and Tr3 are driven based on the clock signal CLK in a complementary manner. However, the comparison example has a disadvantage that power loss is large. This disadvantage is described below.

In the following description, a period of time where the clock signal CLK is at a high level is referred to as the "first period", and a period of time where the clock signal CLK is at a low level is referred to as the "second period". In either the power supply circuit 1 of the first embodiment or the comparison example, currents flowing through the transistors Tr1, Tr2, and Tr3 flow through capacitive loads. Therefore, the currents flowing through the transistors Tr1, Tr2, and Tr3 increase sharply (i.e., inrush currents flow) when they are turned ON, and then decrease exponentially. For this reason, in the description below, the currents (2×Iout, Iout) flowing through the transistors Tr1, Tr2, and Tr3 are represented as average currents.

In the comparison example, during the first period, the transistors Tr1, Tr2, and Tr3 are. ON, OFF, and ON, respectively, and during the second period, the transistors Tr1, Tr2, and Tr3 are ON, ON, and OFF, respectively. Accordingly, twice as much current as the output current Iout (i.e., 2×Iout) flows through the transistor Tr1. Further, when the clock signal has a duty cycle of 50%, as much current as the output current Iout (i.e., Iout) flows through the transistors Tr2 and Tr3.

In the comparison example, losses Ptr1, Ptr2, and Ptr3 in the transistors Tr1, Tr2, and Tr3 are given by the following equations (6), (7), and (8), respectively.

$$Ptr1=(VB-Vs1)\times 2\times Iout \quad (6)$$

$$Ptr2=Ron2\times 4\times Iout^2\times Doff \quad (7)$$

$$Ptr3=Ron3\times 4\times Iout^2\times Don \quad (8)$$

In the equations (6), (7), and (8), Vs1 represents a source voltage of the transistor Tr1, Don represents an ON-duty (i.e., a ratio of the first period to one cycle) of the clock signal CLK, Doff represents an OFF duty (i.e., a ratio of the second period to one cycle) of the clock signal CLK, Ron2 represents an ON-resistance of the transistor Tr2, and Ron3 represents an ON-resistance of the transistor Tr3. It is noted that losses in the diodes D1 and D2 are neglected because they are the same between the power supply circuit 1 of the first embodiment and the comparison example.

A total loss Ptotal in the comparison example is given by the following equation (9).

$$Ptotal=Ptr1+Ptr2+Ptr3=2\times(VB-Vs1)\times Iout+4\times Ron3\times Iout^2\times Don+4\times Ron2+Iout^2\times Doff \quad (9)$$

Figure 5:
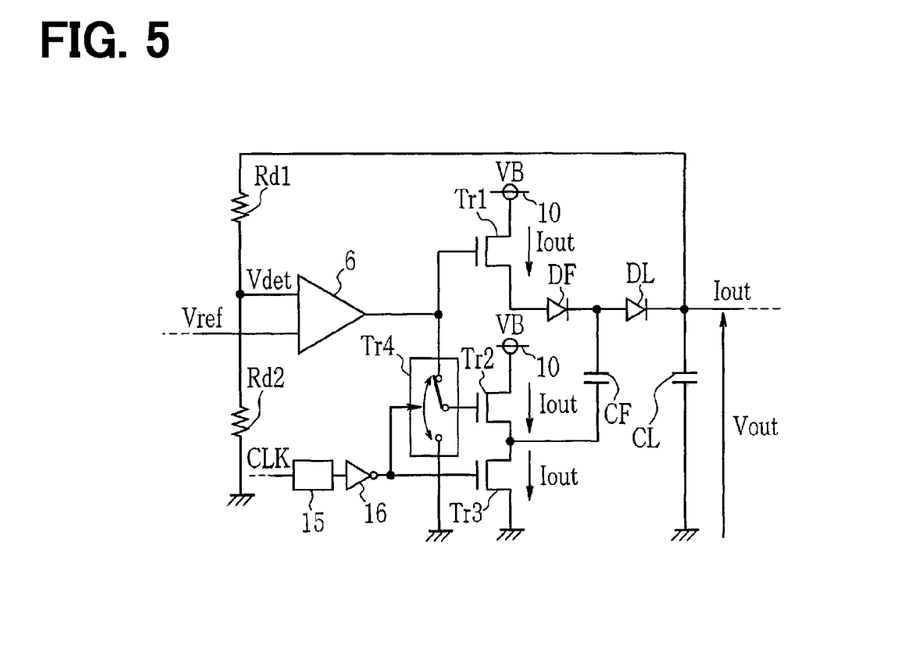
FIG. 5 is a circuit diagram of the power supply circuit according to the first embodiment.

On the other hand, in the power supply circuit 1 of the first embodiment, the transistors Tr1, Tr2, and Tr3 are ON, OFF, and ON, respectively, and during the second period, the transistors Tr1, Tr2, and Tr3 are OFF, ON, and OFF, respectively. In this case, as shown in FIG. 5, when the clock signal has a duty cycle of 50%, as much current as the output current Iout (i.e., Iout) flows through the transistors Tr1, Tr2 and Tr3. It is noted that in FIG. 5, the transistor Tr4 of the drive circuit 14 is indicated by a symbol of a switch.

In the power supply circuit 1 of the first embodiment, losses Ptr1, Ptr2, and Ptr3 in the transistors Tr1, Tr2, and Tr3 are given by the following equations (10), (11), and (12), respectively, where Vs2 represents a source voltage of the transistor Tr2 during the second period.

$$Ptr1=(VB+Vs1)\times 2\times Iout\times Don \quad (10)$$

$$Ptr2=(VB+Vs2)\times 2\times Iout\times Doff \quad (11)$$

$$Ptr3=Ron3\times 4\times Iout^2\times Don \quad (12)$$

Assuming that the source voltage Vs1 of the transistor Tr1 is equal to the source voltage Vs2 of the transistor Tr2, a total loss Ptotal in the power supply circuit 1 of the first embodiment is given by the following equation (13).

$$Ptotal=Ptr1+Ptr2+Ptr3=2\times(VB+Vs1)\times Iout+4\times Ron3\times Iout^2\times Don \quad (9)$$

As can be seen from the equations (9) and (13), the total loss Ptotal in the power supply circuit 1 of the first embodiment is less than the total loss Ptotal in the comparison example by the amount of the loss Ptr2 (=Ron2×4×Iout²× Doff) in the transistor Tr2 in the comparison example.

As described above, since the loss in the power supply circuit 1 of the first embodiment is smaller than that in the comparison example, the power supply circuit 1 of the first embodiment can have high power conversion efficiency compared to the comparison example. Further, in the power supply circuit 1 of the first embodiment, the size of each of the transistors Tr1 to Tr3 can be reduced compared to in the comparison example. Accordingly, the power supply circuit 1 can have a small circuit size compared to the comparison example.

Further, in the power supply circuit 1 of the first embodiment, the transistors Tr1 to Tr4 are N-channel transistors. Therefore, the chip size can be reduced compared to when they are P-channel transistors. Accordingly, the power supply circuit 1 of the first embodiment can have a small circuit size.

Second Embodiment

A power supply circuit 21 according to a second embodiment of the present disclosure is described below with reference to FIG. 6.

Figure 6:
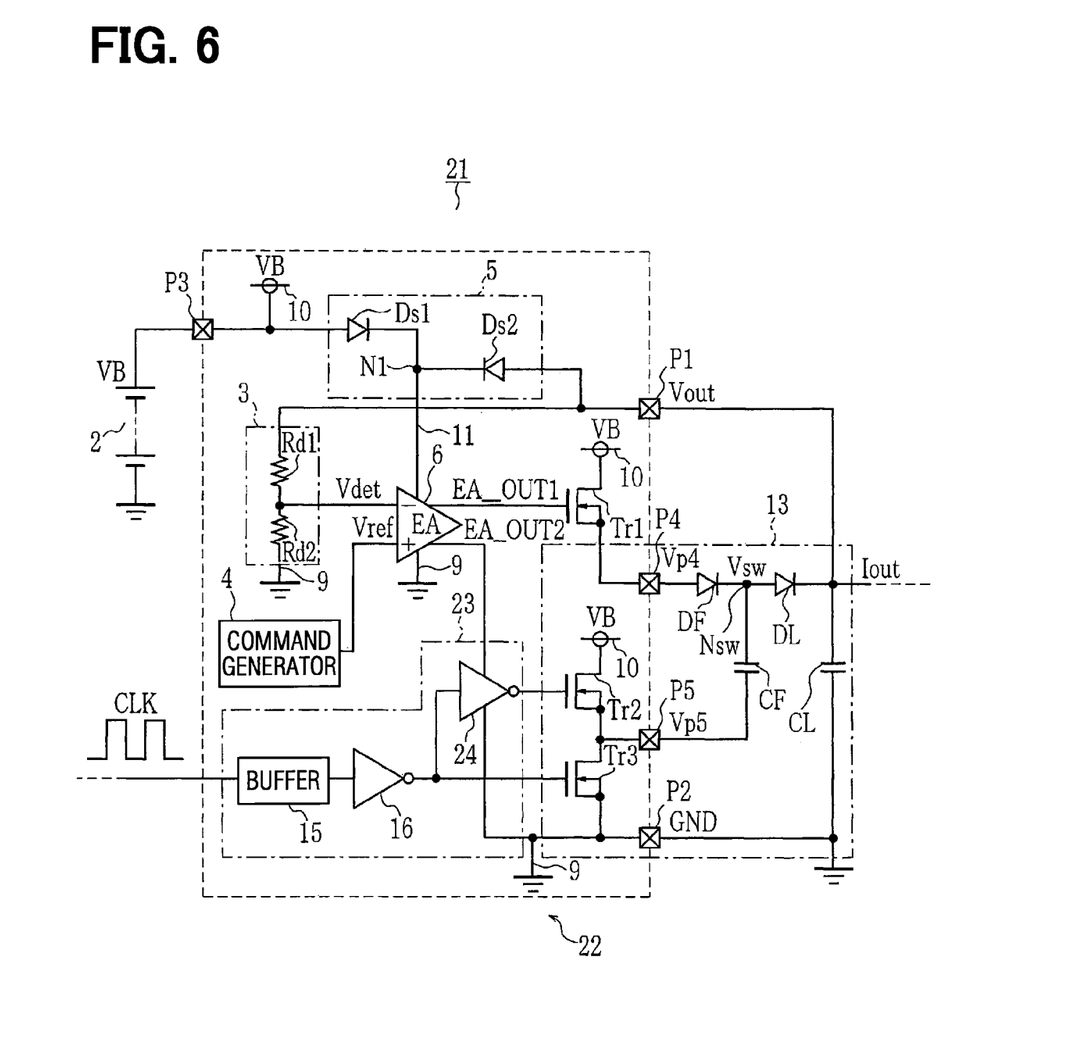
FIG. 6 is a circuit diagram of a power supply circuit according to a second embodiment of the present disclosure.

As shown in FIG. 6, a step-up section 22 of the power supply circuit 21 of the second embodiment differs from the step-up section 7 of the power supply circuit 1 of the first embodiment in that it includes a drive circuit 23 instead of the drive circuit 14. The drive circuit 23 differs from the drive circuit 14 in that it includes an inverter circuit 24 instead of the transistor Tr4.

An output voltage of the inverter circuit 16 is inputted to the inverter circuit 24, and the inverter circuit 24 outputs a voltage to the gate of the transistor Tr2 by inverting the inputted voltage. A control voltage EA_OUT2 outputted from the error amplifier 6 is supplied as a power voltage to the inverter circuit 24. Accordingly, the maximum value of the output voltage of the inverter circuit 24 becomes almost equal to the control voltage EA_OUT2.

Also in the structure, the source voltage (i.e., the voltage Vp5 of the terminal P5) for determining the step-up factor of the charge pump is feedback-controlled based on the value of the output voltage Vout. Thus, the same effect and advantage as obtained in the first embodiment can be also obtained in the second embodiment.

Third Embodiment

A power supply circuit 31 according to a third embodiment of the present disclosure is described below with reference to FIG. 7.

Figure 7:
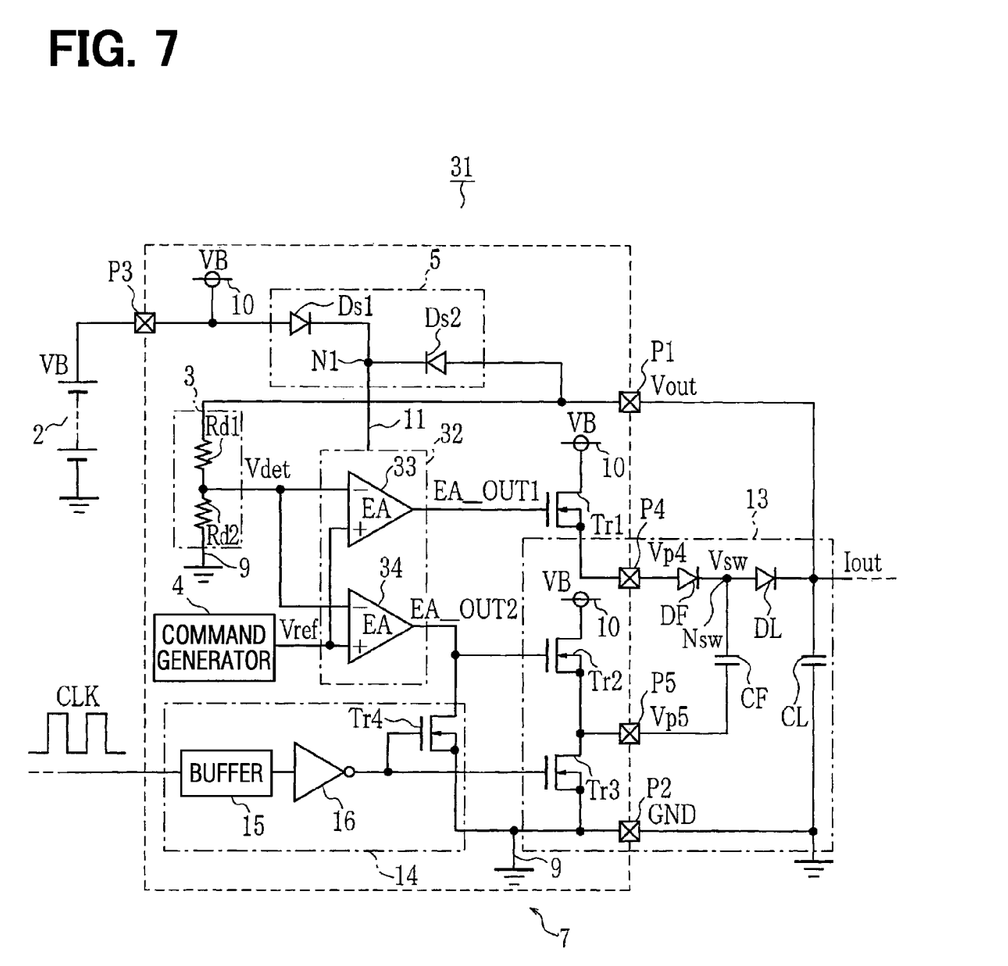
FIG. 7 is a circuit diagram of a power supply circuit according to a third embodiment of the present disclosure.

As shown in FIG. 7, the power supply circuit 31 of the third embodiment differs from the power supply circuit 1 of the first embodiment in that it includes an error amplification circuit 32 instead of the error amplifier 6. The error amplification circuit 32 has includes two error amplifiers 33 and 34.

Each of the error amplifiers 33 and 34 operates on a power voltage supplied through the power line 11. The detection voltage Vdet is inputted to an inverting input terminal of each of the error amplifiers 33 and 34, and the command voltage Vref is inputted to a non-inverting input terminal of each of the error amplifiers 33 and 34. The error amplifier 33 outputs a control voltage EA_OUT1 depending on a difference between the detection voltage Vdet and the command voltage Vref. The error amplifier 34 outputs a control voltage EA_OUT2 depending on the difference between the detection voltage Vdet and the command voltage Vref. An output terminal of the error amplifier 33 is connected to the gate of the transistor Tr1, and an output terminal of the error amplifier 34 is connected to the gate of the transistor Tr2.

Even in this structure, a change in one of the control voltages EA_OUT1 and EA_OUT2 due to, for example, operating conditions of its destination circuit does not affect the other of the control voltages EA_OUT1 and EA_OUT2. Further, in the power supply circuit 31, a negative feedback circuit is implemented mainly by the error amplifiers 33 and 34 so that the transistor Tr1, which is interposed in a path through which the input voltage to the charge pump circuit 13 is supplied, can be driven and controlled by the output of the error amplifier 33 and that the transistor Tr2, which is interposed in a path through which the voltage for determining the step-up factor of the charge pump circuit 13 is supplied, can driven and controlled by the output of the error amplifier 34. Thus, the same effect and advantage as obtained in the first embodiment can be also obtained in the third embodiment.

Fourth Embodiment

In the preceding embodiments, the step-up section is configured as a double charge pump for doubling an input voltage. Alternatively, the step-up section can be configured as a charge pump for increasing an input voltage by three times or more. As an example, according to a fourth embodiment of the present disclosure, the step-up section is configured as a triple charge pump.

Figure 8:
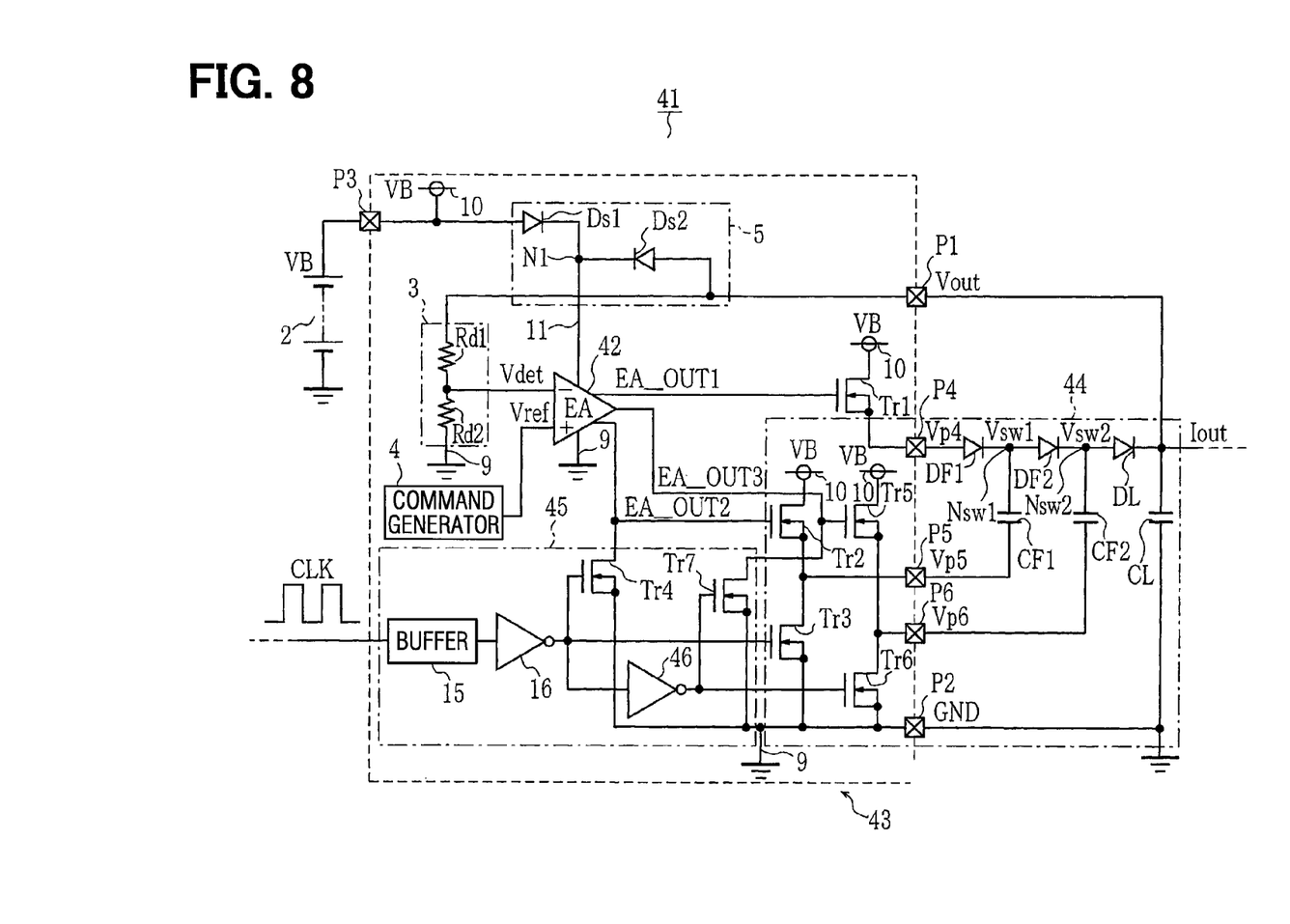
FIG. 8 is a circuit diagram of a power supply circuit according to a fourth embodiment of the present disclosure.

A power supply circuit 41 according to the fourth embodiment is described below with reference to FIG. 8. The power supply circuit 41 differs from the power supply circuit 1 in that it includes an error amplifier 42 instead of the error amplifier 6 and a step-up section 43 instead of the step-up section 7. The error amplifier 42 has a third output terminal for outputting a control voltage EA_OUT3 which changes in the same manner as the control voltages EA_OUT1 and EA_OUT2. A third output path through which the control voltage EA_OUT3 is outputted is independent of the first and second output paths.

The step-up section 43 almost triples a voltage supplied from the terminal P4 and outputs the tripled voltage to the power output terminal P1. The step-up section 43 includes a charge pump circuit 44 and a drive circuit 45. The charge pump circuit 44 differs from the charge pump circuit 13 having a double charge pump configuration in that it further includes a capacitor CF2, and transistors Tr5 and Tr6 which are N-channel MOS transistors. The diode DF, the capacitor CF, and the node Nsw in the charge pump circuit 13 are hereinafter referred to as the diode DF1, the capacitor CF1, and the node Nsw1, respectively.

The diode DF2 corresponds to a reverse flow prevention switching device recited in claims. The anode of the diode DF2 is connected to the node Nsw1, and the cathode of the diode DF2 is connected to a node Nsw2. The node Nsw2 is connected to a first terminal of the capacitor CF2 and the anode of the diode DL. A second terminal of the capacitor CF2 is connected to a terminal P6.

The transistor Tr5 corresponds to a second MOS transistor recited in claims. The drain of the transistor Tr5 is connected to the input power line 10, and the source of the transistor Tr5 is connected to the terminal P6. The gate of the transistor Tr5 is connected to the third output terminal of the error amplifier 42. That is, the transistor Tr5 is interposed in a path from the power input terminal P3 to the second terminal of the capacitor CF2. Thus, the transistor Tr5 is configured as a source-follower to which the control voltage EA_OUT3 is supplied as an input.

The transistor Tr6 corresponds to a third MOS transistor recited in claims. The drain of the transistor Tr6 is connected to the terminal P6, and the source of the transistor Tr6 is connected to the ground line 9. That is, the transistor Tr6 is interposed in a path from the second terminal of the capacitor CF2 to the ground terminal P2. A drive voltage outputted from the drive circuit 45 is supplied to the gates of the transistors Tr5 and Tr6.

The drive circuit 45 differs from the drive circuit 14 having a double charge pump configuration in that it further includes an inverter circuit 46 and a transistor Tr7 which is an N-channel MOS transistor. The output voltage of the inverter circuit 16 is inputted to the inverter circuit 46, and the inverter circuit 46 outputs a voltage to the gates of the transistors Tr6 and Tr7 by inverting the inputted voltage. The drain of the transistor Tr7 is connected to the gate of the transistor Tr5, and the source of the transistor Tr7 is connected to the ground line 9.

The drive circuit 45 drives the transistors Tr2 and Tr3 in a complementary manner based on the clock signal CLK and also drives the transistors Tr5 and Tr6 in a complementary manner based on the clock signal CLK. However, in this case, the transistors Tr2 and Tr5 are driven in a complementary manner while the transistors Tr3 and Tr6 are driven in a complementary manner. The complementary manner means that, when one of the two transistors (e.g., Tr2 and Tr5) is ON, the other is OFF.

According to the fourth embodiment, the step-up section 43 continuously performs the charge pump regardless of the voltage value of the output voltage Vout. Further, the input voltage (i.e., voltage of the terminal P4) to the charge pump circuit 44 and the voltages for determining a step-up factor (i.e., gain) of the charge pump circuit 44 are feedback-controlled based on the output voltage Vout. Thus, the same effect and advantage as obtained in the first embodiment can be also obtained in the fourth embodiment where the step-up section 43 of the power supply circuit 41 has a triple charge pump configuration.

Fifth Embodiment

A power supply circuit 51 according to a fifth embodiment of the present disclosure is described below with reference to FIG. 9.

Figure 9:
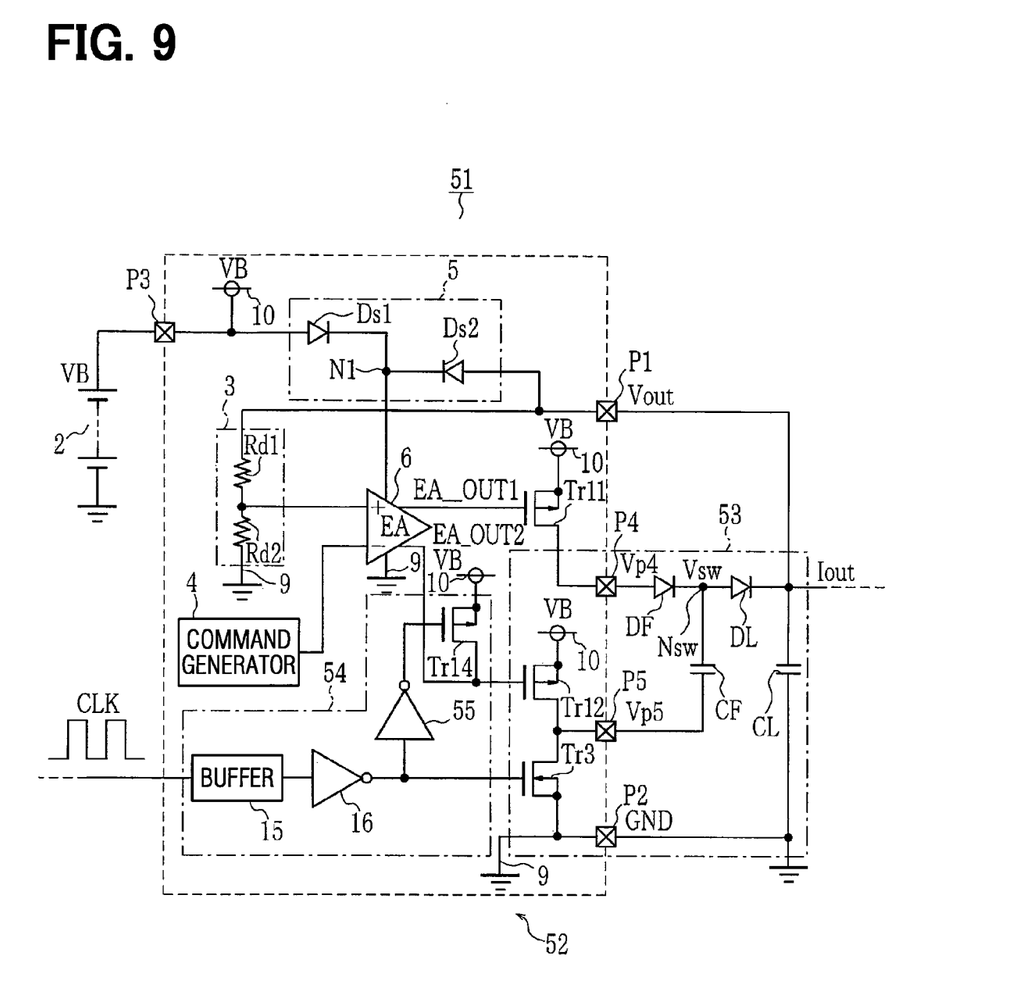
FIG. 9 is a circuit diagram of a power supply circuit according to a fifth embodiment of the present disclosure.

As shown in FIG. 9, the power supply circuit 51 of the fifth embodiment differs from the power supply circuit 1 of the first embodiment in that it includes a transistor Tr11, which is a P-channel MOS transistor, instead of the transistor Tr1 and a step-up section 52 instead of the step-up section 7. Further, the power supply circuit 51 differs from the power supply circuit 1 in a connection configuration near the error amplifier 6.

Specifically, the detection voltage Vdet is supplied to the non-inverting input terminal of the error amplifier 6, and the command voltage Vref is supplied to the inverting input terminal of the error amplifier 6. The source of the transistor Tr11 is connected to the input power line 10, and the drain of the transistor Tr11 is connected to the terminal P4. The control voltage EA_OUT1 outputted from the first output terminal of the error amplifier 6 is supplied to the gate of the transistor Tr11. The transistor Tr11 corresponds to a first MOS transistor recited in claims.

The step-up section 52 differs from the step-up section 7 in that it includes a charge pump circuit 53 instead of the charge pump circuit 13. The charge pump circuit 53 differs from the charge pump circuit 13 in that it includes a transistor Tr12, which is a P-channel MOS transistor, instead of the transistor Tr2. The source of the transistor Tr12 is connected to the input power line 10, and the drain of the transistor Tr12 is connected to the terminal P5. The transistor Tr12 corresponds to a second MOS transistor recited in claims.

The drive circuit 54 differs from the drive circuit 14 in that it includes a transistor Tr14, which is a P-channel MOS transistor, instead of the transistor Tr4. Further, the drive circuit 54 includes an additional inverter circuit 55. The output voltage of the inverter circuit 16 is inputted to the inverter circuit 55, and the inverter circuit 55 outputs a voltage to the gate of the transistor Tr14 by inverting the inputted voltage. The source of the transistor Tr14 is connected to the input power line 10, and the drain of the transistor Tr14 is connected to the gate of the transistor Tr12.

As described above, according to the fifth embodiment, some of the transistors of the power supply circuit 51 are P-channel devices. The same effect and advantage as obtained in the first embodiment, where all of the transistors of the power supply circuit 1 are N-channel devices, can be also obtained in the fifth embodiment.

(Modifications)

While the present disclosure has been described with reference to the embodiments, it is to be understood that the disclosure is not limited to the embodiments. The present disclosure is intended to cover various modifications and equivalent arrangements within the spirit and scope of the present disclosure. For example, the embodiments can be modified as follows.

The diodes DF, DF1, DF2, and DL can be replaced with switching devices or switches such as transistors. In this case, the switching devices or switches need to be turned ON at a time corresponding to when the diodes DF, DF1, DF2, and DL conduct.

In the fourth embodiment, the error amplifier 42 can be replaced with error amplification circuit constructed with three error amplifiers.

The voltage selector 5 is not always necessary and can be omitted.

The step-up section can be configured to increase its input voltage by four or more times instead of two or three times. It is noted that the advantage of the present disclosure over the comparison example becomes more pronounced as the number of stages in the step-up section becomes larger.

The application of the present disclosure is not limited to the power supply circuits 1, 21, 31, 41, and 51 mounted to a vehicle, but can include power supply circuits for other uses such as a mobile phone.

Such changes and modifications are to be understood as being within the scope of the present disclosure as defined by the appended claims.

What is claimed is:

1. A power supply circuit for generating an output voltage having a predetermined target value from an input voltage inputted through a power input terminal, the power supply circuit configured to output the output voltage through a power output terminal, the power supply circuit comprising:
a voltage detector configured to output a detection voltage depending on a voltage of the power output terminal;
a command voltage generator configured to generate a command voltage to command the target value for the output voltage;
an error amplification circuit having a first output path and a second output path to output a control voltage depending on a difference between the detection voltage and the command voltage, the first output path and the second output path being independent of each other;
a first MOS transistor interposed in a path from the power input terminal to an intermediate node and having a gate to which the control voltage outputted through the first output path is supplied, and
a step-up section configured to step up a voltage supplied from the intermediate node and output the stepped-up voltage to the power output terminal, wherein
the step-up section includes a capacitor, a second MOS transistor, a third MOS transistor, and a drive circuit,
a first end of the capacitor is connected to the intermediate node through a reverse-flow-prevention switching device,
the second MOS transistor is interposed in a path from the power input terminal to a second end of the capacitor and has a gate to which the control voltage outputted through the second output path is supplied,
the third MOS transistor is interposed in a path from the second end of the capacitor to a ground,
the drive circuit drives the second MOS transistor and the third MOS transistor in a complementary manner based on a clock signal,
when the clock signal is at a first level, the drive circuit continues to supply the control voltage to the gate of the second MOS transistor while supplying an OFF-drive voltage to a gate of the third MOS transistor to turn OFF the third MOS transistor, and when the clock signal is at a second level different from the first level, the drive circuit supplies an OFF-drive voltage, instead of the control voltage, to the gate of the second MOS transistor to turn OFF the second MOS transistor while supplying an ON-drive voltage to the gate of the third MOS transistor to turn ON the third MOS transistor.

2. The power supply circuit according to claim 1, further comprising:

a voltage selector configured to selectively supply the higher of a voltage of the power input terminal and the voltage of the power output terminal as a power voltage for the error amplification circuit.

3. The power supply circuit according to claim 1, wherein each of the first MOS transistor, the second MOS transistor, and the third MOS transistor is a N-channel transistor.

4. The power supply circuit according to claim 2, wherein each of the first MOS transistor, the second MOS transistor, and the third MOS transistor is a N-channel transistor.

5. The power supply circuit according to claim 1, wherein the input voltage is supplied from a battery mounted to a vehicle.

6. The power supply circuit according to claim 2, wherein the input voltage is supplied from a battery mounted to a vehicle.

7. The power supply circuit according to claim 3, wherein the input voltage is supplied from a battery mounted to a vehicle.

8. The power supply circuit according to claim 4, wherein the input voltage is supplied from a battery mounted to a vehicle.

* * * * *